United States Patent [19]
Fassbender et al.

[11] Patent Number: 5,695,648
[45] Date of Patent: Dec. 9, 1997

[54] METHOD AND APPARATUS FOR WITHDRAWING EFFLUENT FROM A SOLIDS-CONTACTING VESSEL HAVING AN ADJUSTABLE WEIR

[75] Inventors: John J. Fassbender; Donald N. Ruehrwein, both of Batavia; Daniel H. Phillips, Hinckley, all of Ill.

[73] Assignee: Chicago Bridge & Iron Technical Services Company, Oak Brook, Ill.

[21] Appl. No.: 550,743

[22] Filed: Oct. 31, 1995

[51] Int. Cl.$^6$ ............... B01D 21/24; B01D 21/30
[52] U.S. Cl. ............... 210/739; 210/87; 210/248; 210/519; 210/540; 210/629; 210/745; 210/801
[58] Field of Search ............... 210/87, 97, 207, 210/220, 248, 513, 512.1, 512.3, 519, 521, 522, 525, 538, 614, 629, 739, 776, 787, 788, 800, 801, 523, 540, 745; 137/386, 395, 577; 405/87, 92

[56] References Cited

U.S. PATENT DOCUMENTS

| | | |
|---|---|---|
| 2,021,672 | 11/1935 | Spaulding . |
| 2,127,314 | 8/1938 | Spaulding . |
| 2,259,717 | 10/1941 | Zentner . |
| 2,347,318 | 4/1944 | Gurney . |
| 2,355,069 | 8/1944 | Green . |
| 2,366,898 | 1/1945 | Gurney . |
| 2,368,354 | 1/1945 | Green . |
| 2,377,545 | 6/1945 | Felsecker . |
| 2,721,173 | 10/1955 | Lawlor . |
| 3,489,287 | 1/1970 | Streander ............... 210/525 |
| 4,011,164 | 3/1977 | McGivern ............... 210/523 |
| 4,146,346 | 3/1979 | Salo ............... 405/87 |
| 4,146,471 | 3/1979 | Wyness . |
| 4,765,891 | 8/1988 | Wyness . |
| 4,956,100 | 9/1990 | Mikkleson ............... 210/523 |
| 5,188,238 | 2/1993 | Smisson et al. ............... 210/512.1 |

FOREIGN PATENT DOCUMENTS

| | | |
|---|---|---|
| 1296854 | 12/1962 | France . |
| 1642863 | 11/1971 | Germany . |

OTHER PUBLICATIONS

National Lime Assoc., Bulletin 211, *Water Treatment and Supply*, undated.
Permutit, *Clarification*, undated.
CFI, Clarification Tank Brochure, undated.
*Clarifier Design*, Manual of Practice FD–8, Water Pollution Control Federation, pp. 51–72, 1985 (see p. 66).
ClariFlow UpFlow Solids Contact Units Walker Process Bulletin No. 6–W–46A, undated.
*Handbrook of Separation Technologies for Chemical Engineers*, Gas–Solid Separations 6–10 to 6–17, undated.
Kerri et al, "Design of Teacup Solids Separators for Treatment of Sewer Overflows" *Prog. Wat. Tech*, 10:811–820 (1978).

*Primary Examiner*—Joseph W. Drodge
*Attorney, Agent, or Firm*—Marshall, O'Toole, Gerstein, Murray & Borun

[57] ABSTRACT

A method and apparatus are disclosed which provide enhanced solids-contacting vessel performance in a vessel in which untreated liquid is injected into a lower portion of the vessel so as to flow in a substantially helical and upward direct to separate the solids from the liquid in a suspended, rotating sludge blanket. The vessel is equipped with an adjustable weir extending substantially radially form the vessel center to its peripheral wall for withdrawing effluent from the vessel from a variety of locations depending upon the flow velocity characteristics of the liquid in the vessel.

17 Claims, 6 Drawing Sheets

FIG. 9

METHOD AND APPARATUS FOR WITHDRAWING EFFLUENT FROM A SOLIDS-CONTACTING VESSEL HAVING AN ADJUSTABLE WEIR

This invention relates to methods and apparatus for withdrawing effluent from a solids-contacting vessel and particularly an improved method and apparatus for effluent withdrawal to obtain improved vessel performance.

BACKGROUND OF THE INVENTION

In solids-contacting vessels, liquid having suspended or dissolved solids is introduced into the vessel for removal of a portion of the solids, particularly those originally in the liquid or those precipitated from the liquid having a density greater than the liquid in which they are carried. In such vessels, the untreated liquid is introduced into a lower portion of the vessel and removed from an upper portion of the vessel. During the liquid's upward travel, most of the suspended solids are removed, typically with the aid of precipitating and/or flocculating agents added to the vessel.

One such vessel configuration (described in detail in U.S. Pat. No. 4,146,471) provides flow characteristics that optimize solids contacting time and vessel efficiency. The vessel comprises an upper end and a lower end with a substantially conical portion having a large diameter at the upper end and a small diameter at the lower end, an inlet for an untreated liquid at the vessel lower end, means for causing the untreated liquid, fed by the inlet to the vessel lower end, to flow in a helical path upwardly in the conical portion, whereby the solids precipitate and/or agglomerate and separate in a sludge gathering zone in the large diameter conical portion as a revolving sludge blanket layer below, but near the upper end of the vessel with clarified liquid above the sludge blanket. An outlet for clarified liquid is typically positioned at a fixed location somewhere near the liquid surface in the vessel.

This vessel shape provides optimum clarifying because the rotational and upward velocities of liquid in the tank decrease as the liquid nears the top although the flow volume remains the same. As the liquid velocity decreases, the solids have an opportunity to settle and/or be conglomerated at the sludge blanket. The rotating sludge blanket is preferably gradually withdrawn through a central, and vertically adjustable, downcomer. Other means for withdrawing sludge may be used.

As is apparent from the above description, the relative velocity of the liquid throughout the vessel plays an important role in vessel performance. Under ideal circumstances, withdrawal of liquid at a fixed location along the surface will result in consistent effluent quality and previously known solids-contacting vessels are equipped with only fixed effluent outlets.

In practice, other factors affect the quality of the effluent withdrawn from the vessel including: vessel shape; the vessel's interior smoothness; the location, size and orientation of the liquid inlet means; the location, size and orientation of any structures located within the vessel; the volume and density of the sludge blanket; the relative flowrate of the incoming liquid going to each of multiple liquid inlet means; start-up and shut-down procedures; varying liquid temperatures; varying liquid flow rates; and others. These factors influence effluent quality because they affect upward and rotational liquid velocities which can cause short-circuiting of the liquid through the vessel and result in shorter solids-contacting time and/or localized areas of high vertical liquid velocities which would carry suspended solids, that would normally settle, up through the clarification portion of the vessel to the effluent withdrawal means. Further, zones of liquid along a horizontal radius of the vessel near the sludge blanket may have higher upward and/or rotational velocities than others. Higher upward and/or rotational velocities generally result in less effective solids removal and higher percentage of solids retained in effluent. Thus, controlling high velocity zones or removing effluent from zones of desired velocities results in improved vessel performance. Unfortunately, these zones can not be accurately and precisely determined at design of the vessel and they vary due to changes in the flow rate, temperature chemical feed rates, etc. which can also vary over relatively short periods of operating time. Known fixed effluent withdrawal units can not adapt to changing conditions within the vessel.

SUMMARY OF THE INVENTION

The present invention overcomes the shortcomings of the known solids-contacting vessels with fixed effluent withdrawal systems. In accordance with the present invention, there is provided a method for withdrawing effluent from a solids-contacting vessel in which untreated liquid is injected into a lower portion of the vessel so as to flow in a substantially tangential direction, or injected in some manner other than tangentially so that, with the aid of baffles or other means, an upward helical flow pattern is obtained to separate the solids from the liquid in a suspended and rotating sludge blanket below the surface of the liquid in the tank, the method includes the steps of: monitoring the velocity of the liquid above the rotating sludge blanket to identify areas of relatively low velocity and areas of relatively high velocity; and withdrawing effluent from areas of desired liquid velocity.

The method step of selectively withdrawing effluent includes opening a portion of a partially submerged radial weir effluent withdrawal device within the area of desired liquid velocity to receive effluent.

The adjustable radial weir may also be used to control the velocity of the liquid so that the velocity profile is more uniform.

The method step of monitoring the velocity of the liquid includes injecting die into the liquid along a substantially radial line above the rotating sludge blanket and observing the radial dye line for distortion brought on by a varying velocity profile in the liquid. Alternatively, this step can be performed by positioning velocity probes in the liquid above the sludge blanket. Velocity probes may be permanently mounted or portable devices. This step may also be performed by observation of sludge particles moving on top of the sludge blanket at velocities relative to the liquid velocity in that zone.

Also in accordance with the present invention there is provided apparatus for withdrawing effluent from a solids-contacting vessel in which untreated liquid is injected into a lower portion of the vessel so as to flow in substantially helical and upward directions to separate the solids from the liquid in a suspended and rotating sludge blanket below the surface of the liquid in the tank, the apparatus including: a trough positioned substantially horizontally and radially in the vessel and at least partially submerged in the liquid; a plurality of inlet means mounted on the trough; means for opening and closing the inlet means to control the amount of liquid that flows into the trough; and means for removing liquid from the trough. A substantially horizontal trough which is located at an angle to the radial line could also be used. Individual effluent pipes, sliding gates, and valves or other means, spaced across the radial dimension could also be used.

DETAILED DESCRIPTION OF THE DRAWINGS

Figures 1, 2:
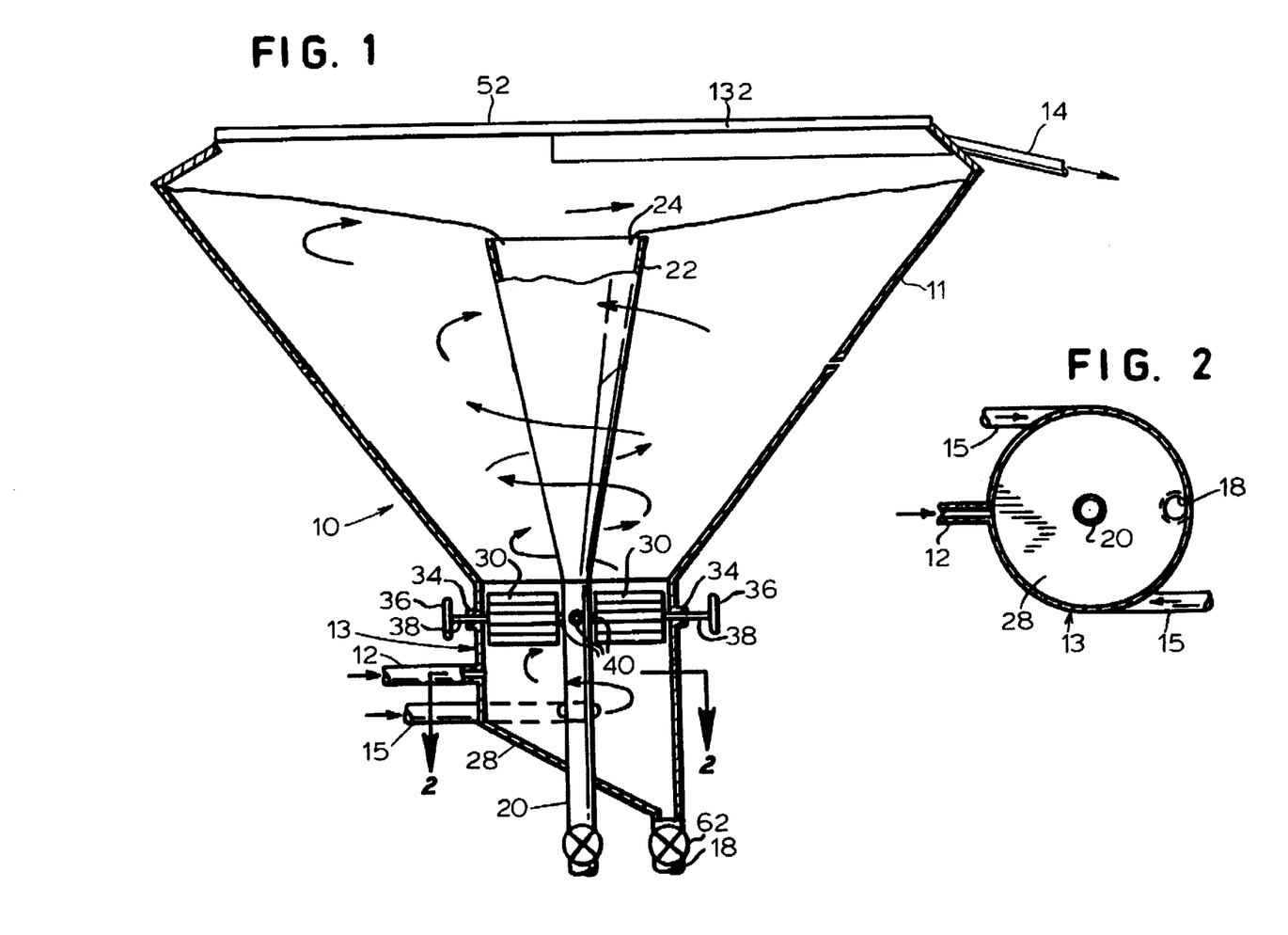
FIG. 1 is a cross-sectional view of a solids-contacting vessel is which applicants' process may be performed showing the typical direction of liquid flow through the vessel.
FIG. 2 is a transverse cross-sectional view of the lower portion of the apparatus of FIG. 1.

Referring in more detail to the drawings, in FIG. 1 a vessel 10 that may be and is preferably used with the present invention is shown having walls 11 formed in the shape of a frustum of a cone with the minimum diameter located at the bottom and with the maximum diameter located near the top. Attached to the lower extremity of the cone is a cylindrical inlet chamber 13 having one or more tangential inlets 15 for water and one or more inlets 12 for water-treating chemicals. The chemical inlet 12 is preferably located so the entering chemicals flow across the path of water entering through inlets 15 to insure adequate mixing of the chemicals and of the water to be treated. The cylindrical inlet chamber 13 has a sloping bottom 28 provided with an outlet 18 and a valve 62 so any accumulation of sludge or heavy materials may be removed, and so the equipment can easily be cleaned during down periods. In vessels such as that depicted, there may be in the cylindrical inlet chamber 13 a plurality of baffles 30 that are mounted on shafts 38 which extend through bearings 34 in the wall of that cylindrical inlet chamber and that are adjustably controlled by handles 36. The inner extremities of the shafts 38 are mounted in bearings 40 on vertical outlet pipe 20, which is located centrally of the cylindrical inlet chamber 13. These baffles are not necessary, and may be omitted from the vessel, when practicing the present invention. Vertical pipe 20 extends upwardly through the cylindrical inlet chamber 13 and attaches to an optional central vertically adjustable downcomer 22 which extends upwardly and centrally in the vessel 10 to a location near the maximum diameter portion.

The top of the vessel may be covered or left open for observation purposes. Across the top, an observation bridge 52 is positioned and a weir trough 132 is suspended therefrom for removing effluent.

In operation, water to be clarified enters cylindrical inlet chamber 13 through tangentially located inlets 15. The tangential inlets impart a generally helical motion to the water entering the vessel, shown by the arrows in FIG. 1 to be a left-handed helical motion. The helical motion imparted to the inlet water causes the water to flow in a generally helical path from the inlet through the vessel vertically until it passes into a trough means, such as weir (described below), and out through outlet Treating chemicals, such as ferrous sulfate, aluminum sulfate, or other conventional chemicals, may be added through chemical inlet 12, which is arranged so the flow of chemicals into the mixing chamber is not parallel to the flow of water, thus promoting mixing of the chemicals with the inlet water. On being introduced into the chamber, the chemicals react with the inlet water to form a precipitate and/or floc which converts the dissolved and/or suspended solid materials in the water to a form that can be removed by sedimentation. The mixture of water and chemicals rises and may contact baffles 30 when present to promote and increase additional mixing. The primary function of baffles 30, however, is to control the rotational and vertical velocity of the stream of water in the tank, and to provide as uniform velocities as possible.

Ideally the mixed water and chemicals rise in a generally helical path out of cylindrical inlet chamber 13 into the conical section of the vessel. As the mixture rises through the conical portion of the vessel, the cross-sectional area of the vessel increases, resulting in a corresponding decrease in the space flow rate of the treated water through the vessel, although the net flow rate remains constant. Additional baffling (see U.S. Pat. No. 4,146,471) may be used to control vertical and rotational velocity of the liquid through the vessel 19, but they are not necessary for the satisfactory performance of the invention.

The helical path of motion imparted to the water and chemicals and the decreasing space flow rate increase the number of contact opportunities of the water and chemicals over that of a straight flow-through system by lengthening the path of travel. Increased contact allows adequate opportunity for the chemicals to adequately react with, precipitate, coagulate and flocculate the contaminating solid materials present in the liquid. As the space flow rate decreases, the vertical velocity of the water decreases until the flocs which are formed are no longer carried by the drag or lift and turbulence of the water, and a point of equilibrium is reached where the lifting force of the water and the counteracting gravitational force on the precipitates and/or flocculated particles are in equilibrium, causing a suspended rotating sludge blanket of the precipitated and/or flocculated materials to accumulate in the vessel. The rotating sludge blanket is suspended at or below the maximum diameter of the vessel. The treated water continues to flow vertically through the rotating sludge blanket, leaving the suspended matter behind in the rotating sludge layer. The treated water flows through an effluent collection means (described below) into a collecting chamber and out through outlet 14 as clarified effluent water. Treatment chemicals and flocculated particles continue to react and to collect solid matter from the water flowing through the rotating sludge blanket, thereby causing floc growth, until the sludge particles ultimately move into the central quiescent zone 24 and are removed through the mouth of the central vertical downcomer 22.

In the rotating sludge blanket, the rotational forces imparted to the water and chemicals in the generally helical path tend to push the heavier particles and flocculated material generally outwardly toward the periphery of the vessel 10. However, by removing the particles in a central quiescent zone, the floc tends to 40 flow towards the center of the vessel. The overall result is the development and maintenance of a uniform rotating sludge blanket. A uniform rotating sludge blanket provides uniform filtration and clarification of the water which passes upwardly through the rotating sludge blanket. Other sludge removal means can be used as it is not critical to realizing the benefits of the present invention.

Although the above-described flow pattern is generally uniform and constant during operation of the solids-contacting vessel 10, certain vessel and operating conditions may alter the flow patterns and localized rotational and vertical velocities of the liquid. For example, some of the liquid entering the vessel 10 could "short circuit" the helical flow pattern as illustrated in FIG. 1 and flow directly up the wall 11 of the vessel 10 as illustrated by arrows in FIG. 3. Without adequate velocity reduction and detention time, the quantity of liquid that short circuits the ideal helical flow pattern will retain a greater amount of solids that would preferably be left in the vessel 10, rather than being withdrawn together with cleaner effluent. If the effluent withdrawal means were located at the end of the short circuit path then the effluent will contain undesirably high levels of solids regardless of how efficient other solids-contacting aspects of the treatment process perform.

Another phenomenon that can inhibit vessel efficiency is localized zones of relatively high velocity liquid resulting from such events as rising atmospheric or liquid temperatures, blocked effluent withdrawal weirs, vessel characteristics, etc. As described above, solids-contacting vessels perform efficiently due to contact opportunities with treatment chemicals and steadily decreasing velocity through the vessel. Obviously, zones of increased velocity defeat these objectives and liquid within these zones will have a higher solids content than liquid in zones of relatively lower velocity. Because the unique events are not easily controlled, it is desirable to withdraw effluent from zones of relatively low velocity.

On the other hand, zones of little or no velocity may have other undesirable attributes that would deteriorate the quality of effluent. Visual inspection and/or chemical testing provide an operator with information about optimum liquid velocities for the highest quality effluent to enhance vessel performance.

To determine zones of relatively high rotational velocity versus zones of relatively low rotational velocity a number of methods can be employed. One example is to inject a line of dye along a radius of the vessel 10 using a long syringe. Distortion of the dye line will clearly indicate zones of relatively high rotational velocity and the means for withdrawing effluent from the vessel will be employed in zones away from the zone of high velocity.

Another method for monitoring rotational flow velocities is the use of active electronic flow velocity gauges such as magnetic velocity probe, a turbine wheel velocity probe, etc. Passive devices such as streamers attached to a submerged radius rope or line in the vessel 10 will provide constant indicators of relative velocity because the streamers in high velocity zones will tend to float horizontally rather than vertically. Further, visual observation of floc particles on the surface of the sludge blanket indicate the zones of high or low liquid velocities.

Figure 3:
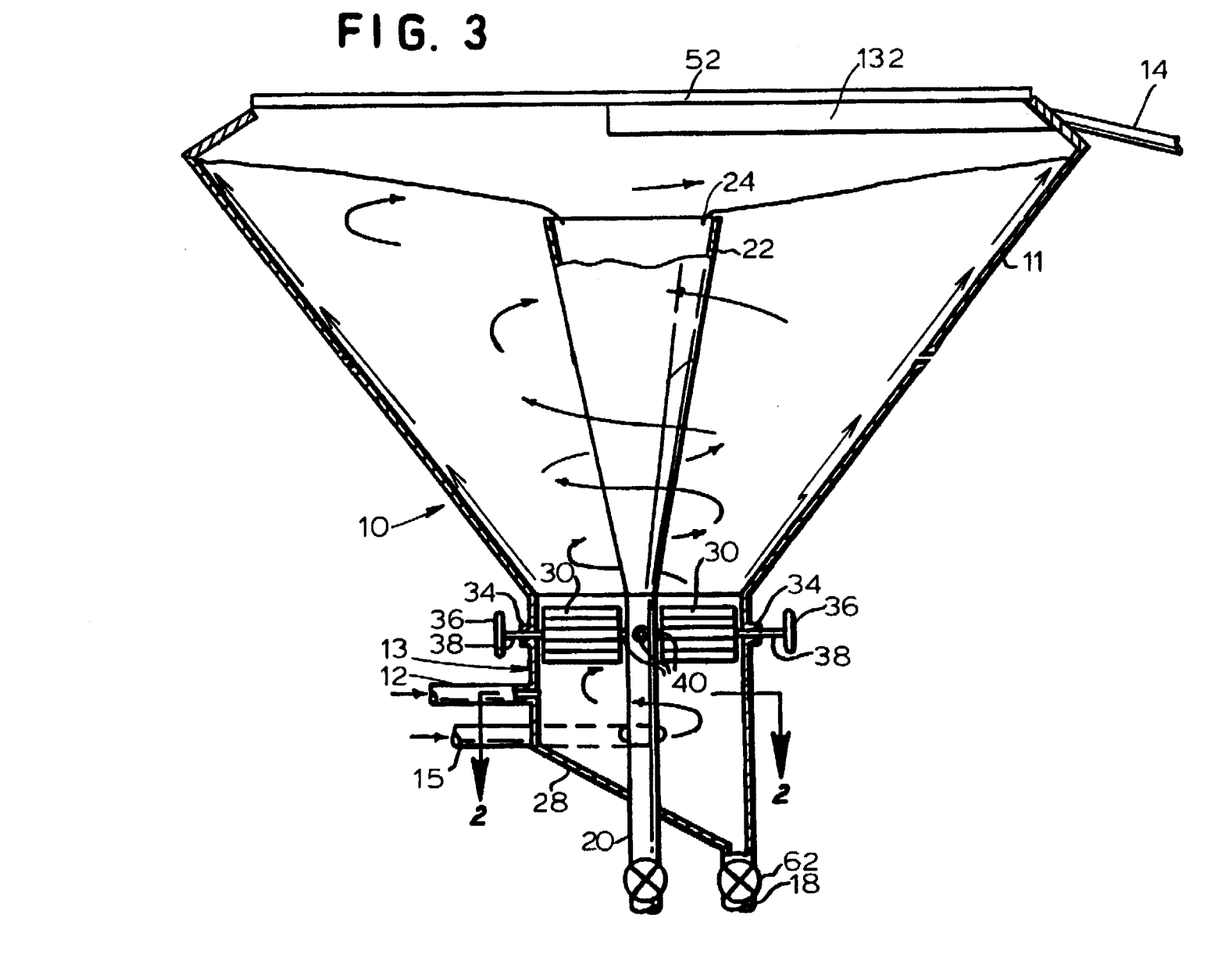
FIG. 3 is a cross-sectional view of a vessel showing a possible deviation from typical desired flow patterns through the vessel.

At times the vertical short circuit path illustrated in FIG. 3 will be visible with the naked eye because the liquid will carry sludge particles above the surface of the sludge blanket in areas with high vertical liquid velocities.

Figure 4:
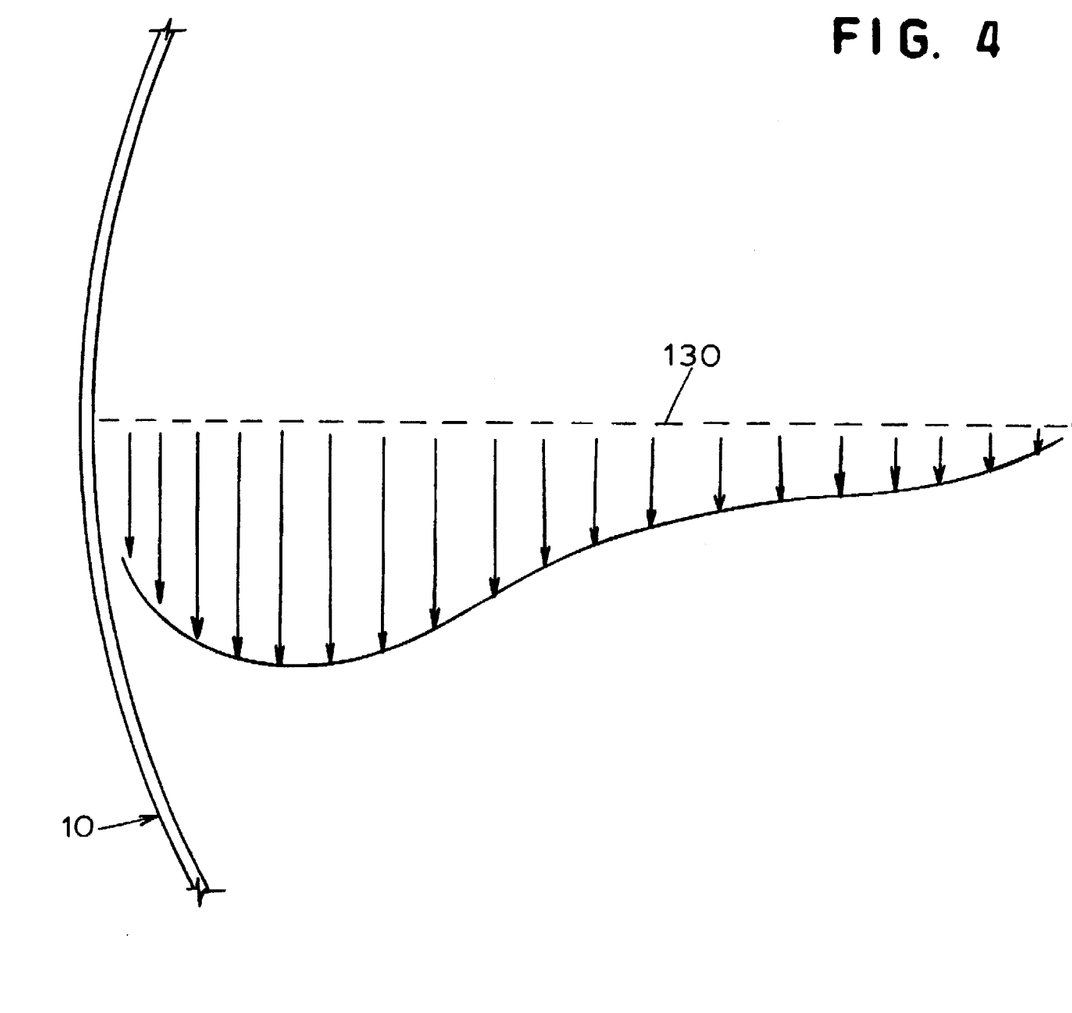
FIG. 4 is a partial plan view of a vessel showing areas of irregular flow patterns in zones of relatively high velocity and relatively low velocity.

FIG. 4 illustrates a partial plan view of a vessel with a radius line 130. The longer arrows indicate high liquid rotational velocities and the shorter arrows indicate lower liquid rotational velocities. Depending on the desired effluent quality, effluent can be withdrawn at any point on the radius profile. Typically, zones of lower velocities (shorter arrows) provide optimum effluent quality and are where effluent will be withdrawn.

Figure 5:
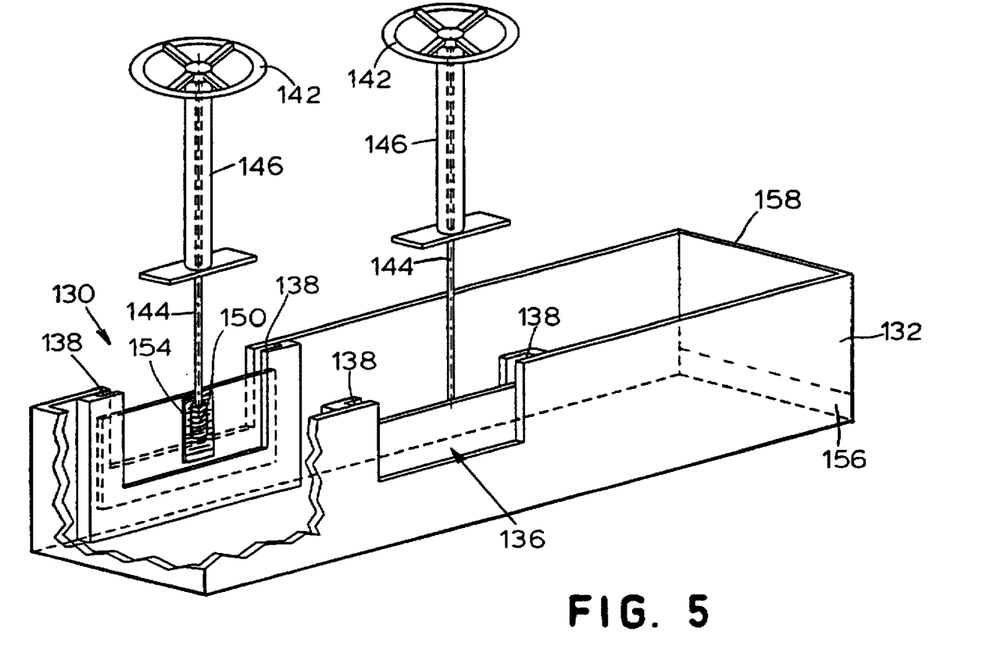
FIG. 5 is a partial perspective view of an effluent withdrawal weir with vertically sliding gates for selectively withdrawing effluent from the vessel.

FIG. 5 illustrates an apparatus 130 for withdrawing effluent from the vessel from selected locations of relatively low rotational velocity along a radius of the vessel. The apparatus 130 includes a trough 132 which is positioned in the vessel and partially submerged in the in the liquid.

The trough 132 includes a pair of sliding gates 136 positioned on opposing sides of the trough 132. The use of one or more sliding gates on one side of the trough only may be used.

The sliding gates 136 are positioned within vertical slots 138 or other suitable retention means with a snug fit and/or gaskets to limit seepage around the sides of the plates. Preferably, all of the effluent will flow over the top of the gates 136.

When a zone of relatively low velocity effluent is identified and effluent from that zone is desired, the sliding gates are lowered by rotating hand wheels which are secured to a walkway over the vessel 11. The hand wheels 142 have shafts 144 are retained in sleeves 146 fixed to the walkway, but are still free to rotate. The lower portions of the shafts 144 are fitted with worm gears 150 that engage racks 154 that are mounted on the sliding gates 136. As effluent spills over the sliding gates 136 it flows into a weir trough 132 and out of an outlet 156 at the outer end 158 of the weir trough 132.

Conversely, when it is desired to slow the liquid velocity in a particular zone, gates (or the valves and pipes described below) can be closed to extend the vessel retention time for that liquid.

Although not illustrated, similar sliding gates are positioned adjacent one another or spaced apart along the entire length of the weir trough 132. Such an arrangement enables withdrawal of effluent at desired locations along the radius of the vessel and the number of gates affects the degree with which various zones can be manipulated. The greater the number of gates, the more selective withdrawal can be.

Figure 6:
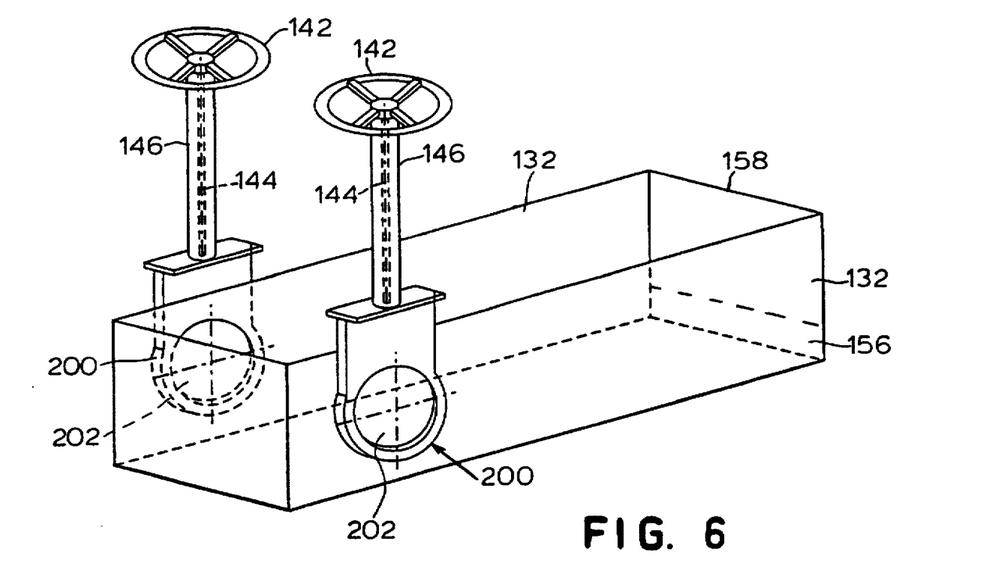
FIG. 6 is a partial perspective view of a first alternative effluent withdrawal means.

Illustrated in FIG. 6 is an optional embodiment of the effluent withdrawal apparatus in the form of valves 200 that are opened as desired to receive effluent into the weir trough 132. Like the sliding gates described above, the valves 200 are controlled by hand wheels 142, which raise or lower a vertically movable knife gate 202 to open or close the gate as desired. Again, a number of gates will be positioned along the weir trough.

Figure 7:
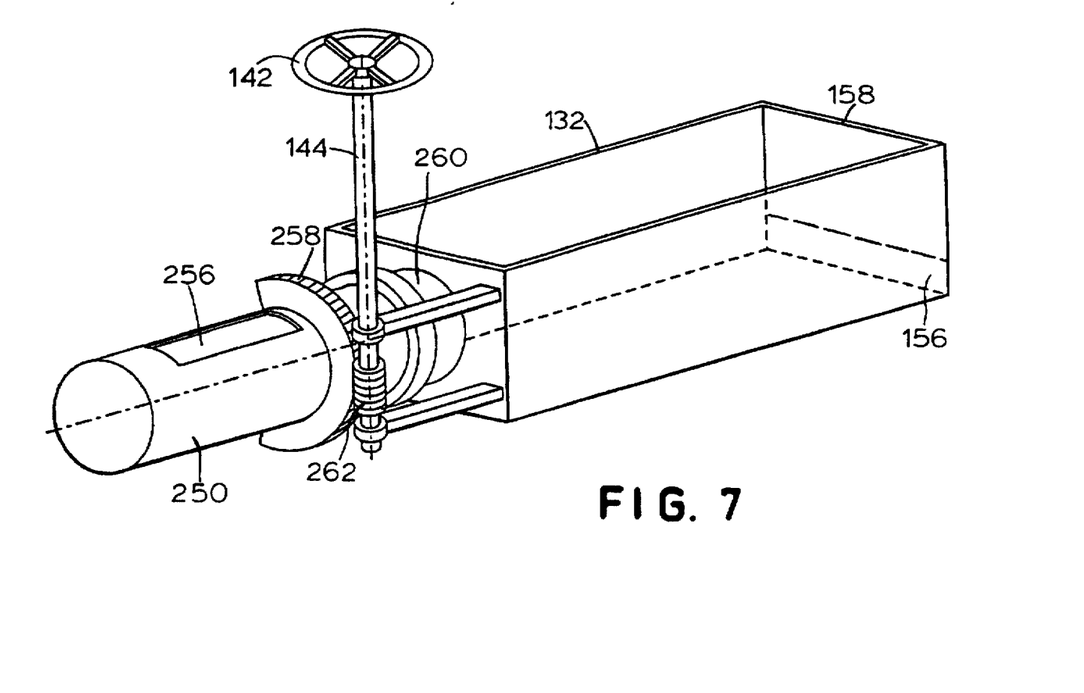
FIG. 7 is a partial perspective view of an effluent withdrawal means with a rotating pipe for receiving effluent.

Another alternative is illustrated in FIG. 7 and it includes a rotating pipe 250 extending outwardly from the trough 132 and in liquid communication therewith. The rotating pipe 250 defines an slot or opening 256, such as the rectangular opening depicted. The rotating pipe 250 is in rotating and substantially sealed contact with a nipple 260 that itself is in liquid communication with the trough 132. The rotating pipe may be positioned parallel to or perpendicular to the radius of the vessel or at any angle therebetween. The rotating pipe 250 is preferably positioned substantially horizontal and about half submerged in the liquid in the vessel. When it is desired to withdraw effluent through the opening in the rotating pipe 250, a hand wheel 142 like that shown above may be rotated to rotate a shaft 144 and a worm gear 262 fixed to the lower portion of the shaft 144. The pinion gear 262 is meshed with an arc-shaped rack 258 that is fixed to the rotating pipe 250. As the hand wheel 142 is turned, the pipe 250 rotates until the opening 256 is at least partially submerged and effluent spills into the pipe, flows through the nipple 258, and into the weir trough 158. Different lengths of pipe, and slots may be use. Further, the edges of the slot may be angled so that, when lowered to the water surface, they draw more flow from one end.

Figure 8:
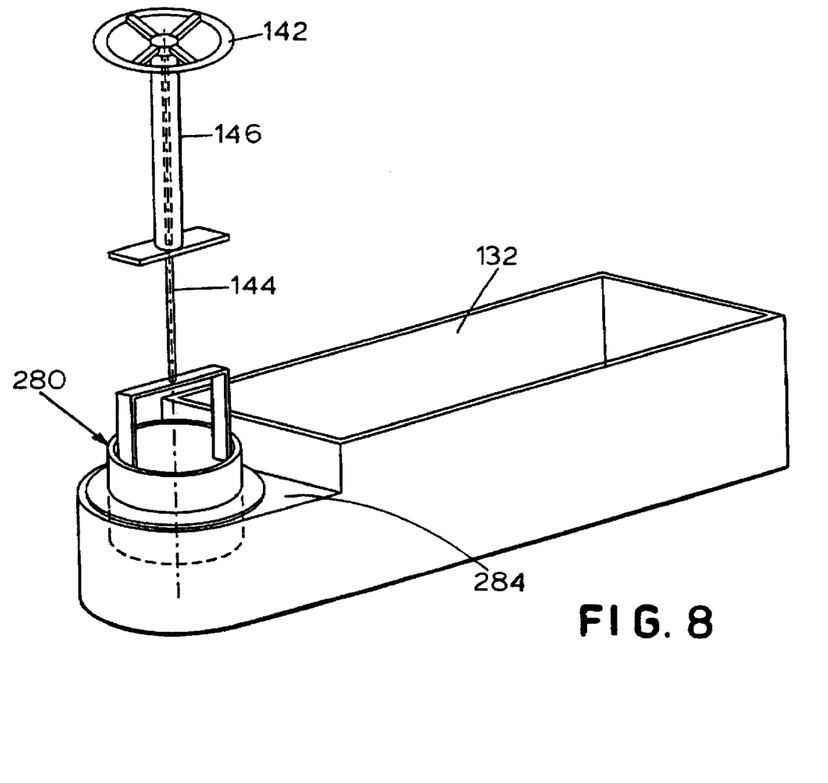
FIG. 8 is a partial perspective view of a slip pipe mounted on an effluent withdrawal trough.

Next, a vertically oriented slip pipe 280 is illustrated in FIG. 8 to perform the effluent receiving function in much the same way as the rotating pipe of FIG. 7 except that the slip pipe 280 moves vertically downward into the liquid to receive effluent into the end of the pipe. Once the effluent has spilled into the slip pipe 280 it flows into a covered portion of the weir trough 284 and out of the vessel 10. Like the gates described above, more than one slip pipe may be used.

Figure 9:
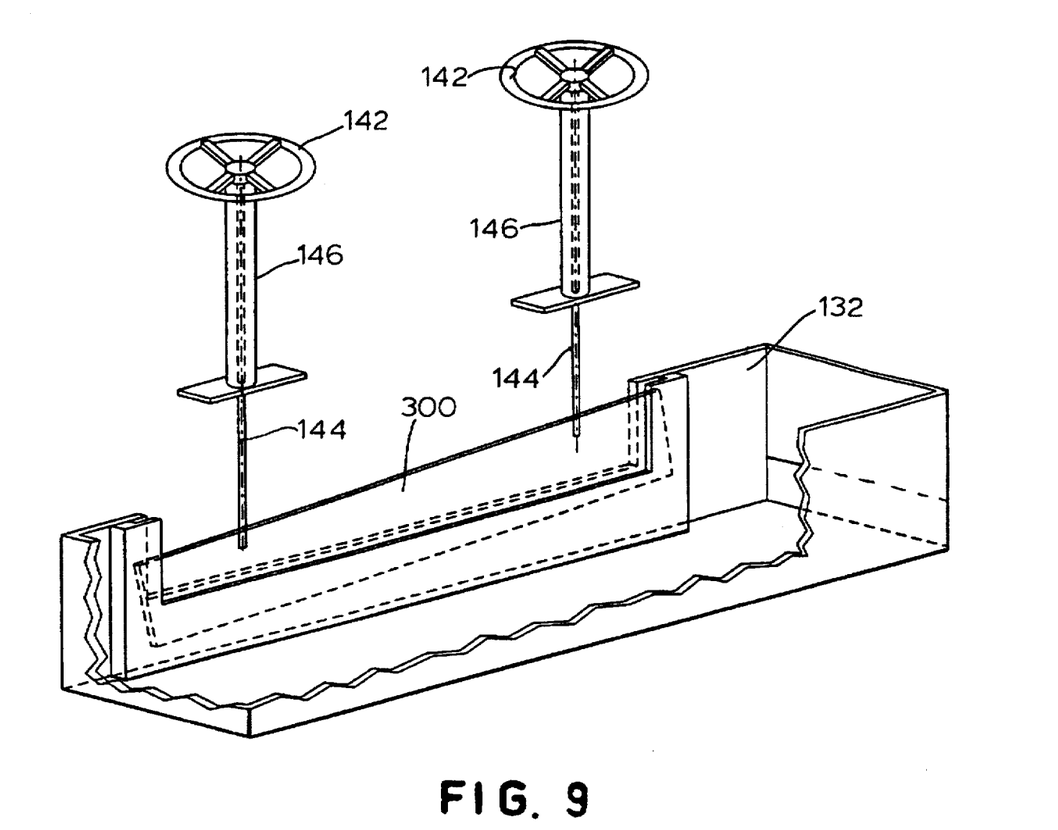
FIG. 9 is a partial perspective view of a sloping weir plate mounted on an effluent withdrawal trough.

Finally, FIG. 9 illustrates a sloping sliding gate 300 that is similar to the sliding gate of FIG. 5, except that it is substantially longer and is controlled, not by one, but two (or more) hand wheels 142. This elongated gate 300 permits the operator to adjust the hand wheels 142 to set the ends of the gate 300 at different elevations. This arrangement is desirable because it will receive liquid over longer lengths using fewer gates. Although this arrangement is less adaptable than those using shorter gates, there are some vessels 10 in which the rotational velocity of the liquid is not as variable and would benefit from the reduced number of plates. Multiple sloping sliding gate weirs may be used.

It will be appreciated that one skilled in the art could modify the process without departing from the spirit of the invention disclosed.

We claim:

1. A method for withdrawing effluent from a solids-contacting vessel in which untreated liquid is injected into a lower portion of the vessel so as to flow in a substantially helical and upward direction to separate the solids from the liquid in a suspended and rotating sludge blanket below the surface of the liquid in the vessel, the method comprising the steps of:

monitoring the velocity of the liquid above the rotating sludge blanket to identify areas of relatively low velocity and to identify areas of relatively high velocity so as to identify areas of optimum liquid velocity; and withdrawing effluent from the identified areas of optimum liquid velocity.

2. The method of claim 1 in which the step of withdrawing effluent comprises the step of:

opening a portion of a partially submerged radial weft effluent withdrawal device adjacent the areas of optimum liquid velocity liquid to receive effluent.

3. The method of claim 1 in which the step of monitoring the velocity of the liquid comprises the steps of:

injecting dye into the liquid along a substantially radial line above the rotating sludge blanket; and observing the radial dye line for distortion brought on by a varying velocity profile in the liquid.

4. The method of claim 1 in which the step of monitoring the velocity of the liquid comprises the step of:

positioning velocity probes in the liquid above the sludge blanket to collect velocity data.

5. The method of claim 1 wherein the step of withdrawing effluent comprises:

withdrawing effluent from a downstream side of a weir trough.

6. A method for withdrawing effluent from a solids-contacting vessel in which untreated liquid is injected into a lower portion of the vessel so as to flow in substantially helical and upward directions to separate the solids from the liquid in a suspended and rotating sludge blanket below the surface of the liquid in the vessel, the method comprising the steps of:

monitoring the velocity of the liquid above the sludge blanket and below a partially submerged radial weir trough to identify areas of relatively low rotational velocity relative to areas of relatively high rotational velocity so as to identify areas of desired liquid velocity;

closing a portion of a radial weir trough adjacent areas of relatively high rotational velocity to induce a more uniform velocity in the vessel; and withdrawing liquid from the vessel through the radial weir trough at locations adjacent areas of desired liquid velocity.

7. The method of claim 6 in which the step of withdrawing effluent from areas of desired liquid velocity comprises the step of:

lowering a sliding gate positioned adjacent the areas of relatively low liquid velocity to receive effluent.

8. The method of claim 6 in which the step of monitoring the velocity of the liquid comprises the steps of:

injecting dye into the liquid along a substantially radial line above the rotating sludge blanket; and observing the radial dye line for distortion due to a varying velocity profile in the liquid.

9. The method of claim 6 in which the step of monitoring the velocity of the liquid comprises the step of:

positioning velocity probes in the liquid above the sludge blanket to collect velocity data.

10. The method of claim 6 wherein the step of withdrawing liquid from through the radial weir trough comprises:

draining water into a downstream side of the weir trough.

11. Apparatus comprising:

a solids-contacting vessel having a peripheral wall; means for injecting untreated liquid into a lower portion of the vessel so as to flow in substantially helical and upward directions to separate the solids from the liquid in a suspended and rotating sludge blanket below the surface of the liquid in the vessel;

a weir trough for withdrawing effluent from the solids-contacting vessel positioned substantially from the center of the vessel to the vessel peripheral wall and at least partially submerged in the liquid in the tank;

a plurality of weir trough openings defined by the trough;

means for opening and closing the openings in the weir trough to control the amount of liquid that flows into the trough at each opening; and means for removing liquid from the trough.

12. The apparatus of claim 11 in which the means for opening and closing the openings in the weir trough comprises a vertically sliding plate adjacent the weir trough openings.

13. The apparatus of claim 11 in which the means for opening and closing the openings in the weir trough comprises a valve at each opening.

14. The apparatus of claim 11 wherein the weir trough has an upstream side and a downstream side and the weir trough openings are defined by the downstream side of the trough.

15. Apparatus comprising:

a solids - contacting vessel having a peripheral wall in which untreated liquid is injected into a lower portion of the vessel so as to flow in substantially helical and upward directions to separate the solids from the liquid in a suspended and rotating sludge blanket below the surface of the liquid in the vessel;

a weir trough for withdrawing effluent from the solids-contacting vessel positioned substantially from the center of the vessel to the vessel peripheral wall and at least partially submerged in the liquid in the tank;

a plurality of weir trough openings defined by the trough;

means for opening and closing the openings in the weir trough to control the amount of liquid that flows into the trough at each opening, the means comprising a sliding plate adjacent the weir trough openings and means for adjusting the vertical slope of the sliding plate; and means for removing liquid from the trough.

16. Apparatus comprising:

a solids-contacting vessel having a peripheral wall in which untreated liquid is injected into a lower portion of the vessel so as to flow in substantially helical and upward directions to separate the solids from the liquid in a suspended and rotating sludge blanket below the surface of the liquid in the vessel;

a weir trough for withdrawing effluent from the solids-contacting vessel positioned substantially from the center of the vessel to the vessel peripheral wall and at least partially submerged in the liquid in the tank;

a plurality of weir trough openings defined by the trough;

means for opening and closing the openings in the weir trough to control the amount of liquid that flows into the trough at each opening, the means comprising a rotating pipe having a wall defining an opening adjacent the weir trough openings through which liquid can flow; and means for removing liquid from the trough.

17. Apparatus comprising:

a solids-contacting vessel having a peripheral wall in which untreated liquid is injected into a lower portion of the vessel so as to flow in substantially helical and upward directions to separate the solids from the liquid in a suspended and rotating sludge blanket below the surface of the liquid in the vessel;

a weir trough for withdrawing effluent from the solids-contacting vessel positioned substantially from the center of the vessel to the vessel peripheral wall and at least partially submerged in the liquid in the tank;

a plurality of weir trough openings defined by the trough;

means for opening and closing the openings in the weir trough to control the amount of liquid that flows into the trough at each opening, the means comprising a vertically sliding pipe adjacent the weir trough openings; and means for removing liquid from the trough.

* * * * *